(12) United States Patent
Cox et al.

(10) Patent No.: US 10,363,974 B2
(45) Date of Patent: Jul. 30, 2019

(54) CONTAINER APPARATUS INCLUDING A SANDWICH STRUCTURE

(71) Applicant: CELLTECH METALS INC., San Diego, CA (US)

(72) Inventors: Douglas Cox, San Diego, CA (US); Fabien Ebnoether, Munich (DE)

(73) Assignee: Celltech Metals Inc., Searcy, AR (US)

( * ) Notice: Subject to any disclaimer, the term of this patent is extended or adjusted under 35 U.S.C. 154(b) by 191 days.

(21) Appl. No.: 15/128,320

(22) PCT Filed: Mar. 25, 2015

(86) PCT No.: PCT/US2015/022546
§ 371 (c)(1),
(2) Date: Sep. 22, 2016

(87) PCT Pub. No.: WO2015/148707
PCT Pub. Date: Oct. 1, 2015

(65) Prior Publication Data
US 2018/0170449 A1    Jun. 21, 2018

Related U.S. Application Data

(60) Provisional application No. 61/970,636, filed on Mar. 26, 2014.

(51) Int. Cl.
*B62D 25/20* (2006.01)
*B62D 33/04* (2006.01)

(52) U.S. Cl.
CPC ....... *B62D 25/2054* (2013.01); *B62D 33/046* (2013.01); *B32B 2250/40* (2013.01)

(58) Field of Classification Search
CPC .............. B62D 25/2054; B62D 33/046; B32B 2250/40

(Continued)

(56) References Cited

U.S. PATENT DOCUMENTS

| | | | |
|---|---|---|---|
| 2,087,010 | A | 7/1937 | Wardle |
| 2,391,997 | A | 1/1946 | Noble |

(Continued)

FOREIGN PATENT DOCUMENTS

| | | | |
|---|---|---|---|
| BE | 663265 | A | 8/1965 |
| DE | 3837890 | A1 | 5/1990 |

(Continued)

OTHER PUBLICATIONS

Stoffer, Harry, "Some suppliers see dollars in a higher CAFE," Automotive News, Crain Communications, Inc., Jul. 2, 2007, 2 pages.

(Continued)

*Primary Examiner* — Jason S Morrow
*Assistant Examiner* — E Turner Hicks
(74) *Attorney, Agent, or Firm* — Harness, Dickey & Pierce, PLC (57) ABSTRACT

A container apparatus includes a sandwich structure. In another aspect, a sandwich structure of a container apparatus employs at least one core sheet including alternating peaks and valleys therein in addition to at least one adhesively bonded outer face sheet. Moreover, another aspect of a container apparatus includes a wheeled box trailer, an intermodal shipping container, a railroad car, or other box-like holding and transporting device. An inner container liner, such as a floor, or structural container frame rail is attached to a structural sandwich in another aspect. A joint or connection between adjacent sandwich structures and/or a sandwich structure and an elongated beam, for a container apparatus is also provided.

62 Claims, 10 Drawing Sheets

(58) Field of Classification Search
USPC ........ 296/186.1, 191, 182.1, 184.1, 29, 39.3
See application file for complete search history.

(56) References Cited

U.S. PATENT DOCUMENTS

| | | | |
|---|---|---|---|
| 2,441,476 A | 5/1948 | Ewald | |
| 2,481,046 A | 9/1949 | Scurlock | |
| 2,605,064 A | 7/1952 | Davis | |
| 2,738,297 A | 3/1956 | Pfisterhammer | |
| 2,809,908 A | 10/1957 | French | |
| 2,950,788 A | 8/1960 | Edgar | |
| 3,013,641 A | 12/1961 | Compton | |
| 3,086,899 A | 4/1963 | Smith | |
| 3,151,712 A | 10/1964 | Jackson | |
| 3,173,383 A | 3/1965 | Eggert | |
| 3,217,845 A | 11/1965 | Koeller | |
| 3,227,598 A | 1/1966 | Robb | |
| 3,432,859 A | 3/1969 | Jordan | |
| 3,481,642 A | 12/1969 | Campbell | |
| 3,525,663 A | 8/1970 | Hale | |
| 3,597,891 A | 8/1971 | Martin | |
| 3,714,747 A | 2/1973 | Curran | |
| 3,742,663 A | 7/1973 | Duskin | |
| 3,757,559 A | 9/1973 | Welsh | |
| 3,797,190 A | 3/1974 | Widdowson | |
| 3,834,487 A | 9/1974 | Hale | |
| 3,865,679 A | 2/1975 | Hale | |
| 3,876,492 A | 4/1975 | Schott | |
| 3,914,486 A | 10/1975 | Borgford | |
| 3,938,963 A | 2/1976 | Hale | |
| 3,950,259 A | 4/1976 | Pallo et al. | |
| 4,025,996 A | 5/1977 | Saveker | |
| 4,044,186 A | 8/1977 | Stangeland | |
| 4,049,855 A | 9/1977 | Cogan | |
| 4,077,247 A | 3/1978 | Stewart | |
| 4,104,840 A * | 8/1978 | Heintz ................... | E04C 2/292 52/309.9 |
| 4,275,663 A | 6/1981 | Sivachenko et al. | |
| 4,344,995 A | 8/1982 | Hammer | |
| 4,356,678 A | 11/1982 | Andrews et al. | |
| 4,411,121 A | 10/1983 | Blacklin et al. | |
| 4,635,992 A | 1/1987 | Hamilton et al. | |
| 4,703,948 A * | 11/1987 | Ehrlich ................. | B62D 21/17 105/422 |
| 4,718,214 A | 1/1988 | Waggoner | |
| 4,910,065 A | 3/1990 | McKinney | |
| 5,030,488 A | 7/1991 | Sobolev | |
| 5,195,580 A | 3/1993 | Hoeffken | |
| 5,366,787 A | 11/1994 | Yasui et al. | |
| 5,580,637 A | 12/1996 | Konta et al. | |
| 5,678,715 A | 10/1997 | Sjostedt et al. | |
| 5,938,274 A | 8/1999 | Ehrlich | |
| 5,992,117 A | 11/1999 | Schmidt | |
| 5,997,076 A * | 12/1999 | Ehrlich .................. | E04C 2/292 296/186.1 |
| 6,010,020 A | 1/2000 | Abal | |
| 6,183,879 B1 | 2/2001 | Deeley | |
| 6,199,939 B1 * | 3/2001 | Ehrlich .................. | B62D 33/04 296/186.1 |
| 6,220,651 B1 | 4/2001 | Ehrlich | |
| 6,257,043 B1 | 7/2001 | Wiens | |
| 6,412,854 B2 | 7/2002 | Ehrlich | |
| 6,497,451 B1 | 12/2002 | Jones et al. | |
| 6,547,280 B1 | 4/2003 | Ashmead | |
| 6,662,424 B2 * | 12/2003 | Ehrlich .................. | B60P 7/0815 29/428 |
| 6,846,559 B2 | 1/2005 | Czaplicki et al. | |
| 6,848,233 B1 | 2/2005 | Haszler et al. | |
| 6,908,143 B2 | 6/2005 | Ashmead | |
| 6,928,848 B2 | 8/2005 | Golovashchenko et al. | |
| 6,939,599 B2 | 9/2005 | Clark | |
| 7,010,897 B1 | 3/2006 | Kuppers | |
| 7,025,408 B2 * | 4/2006 | Jones ..................... | B32B 27/06 296/186.1 |
| 7,100,971 B2 | 9/2006 | Pines | |
| 7,152,912 B1 * | 12/2006 | Roush .................. | B62D 29/045 296/186.1 |
| 7,214,018 B2 | 5/2007 | Lussier | |
| 7,267,393 B2 | 9/2007 | Booher | |
| 7,353,960 B2 * | 4/2008 | Seiter ..................... | B61D 17/18 105/355 |
| 7,401,844 B2 | 7/2008 | Lemmons | |
| 7,500,713 B2 * | 3/2009 | Riley .................... | B62D 33/046 296/186.1 |
| 7,588,286 B2 * | 9/2009 | Lewallen .............. | B60P 7/0815 296/186.1 |
| 7,621,589 B1 * | 11/2009 | Gerome ............... | B62D 33/046 296/186.1 |
| 7,648,058 B2 | 1/2010 | Straza | |
| 7,722,112 B2 * | 5/2010 | Ehrlich ................ | B62D 29/045 296/186.1 |
| 7,752,729 B2 | 7/2010 | Faehrrolfes et al. | |
| 7,753,254 B2 | 7/2010 | Straza | |
| 7,757,931 B2 | 7/2010 | Straza | |
| 7,927,708 B2 | 4/2011 | Mizrahi | |
| 7,971,926 B2 | 7/2011 | Lemmons | |
| 8,016,152 B2 * | 9/2011 | Roush .................. | B62D 33/046 220/652 |
| 8,205,642 B2 | 6/2012 | Straza | |
| 8,342,598 B2 | 1/2013 | Stanton | |
| 8,419,110 B2 | 4/2013 | Katz et al. | |
| 8,434,472 B2 | 5/2013 | Hanson et al. | |
| 8,580,061 B2 | 11/2013 | Cik | |
| 8,835,016 B2 | 9/2014 | Ebnoether | |
| 9,067,729 B2 * | 6/2015 | Fenton ................. | B65D 88/121 |
| 9,434,421 B1 * | 9/2016 | Lu ........................ | B65D 90/026 |
| 9,764,780 B2 | 9/2017 | Zehner et al. | |
| 9,884,660 B2 | 2/2018 | Fenton | |
| 9,884,661 B2 | 2/2018 | Fenton | |
| 2005/0029708 A1 | 2/2005 | Coyle | |
| 2005/0084703 A1 * | 4/2005 | Ashmead ................. | E04C 2/32 428/593 |
| 2009/0071088 A1 | 3/2009 | Viegas et al. | |
| 2009/0159592 A1 | 6/2009 | Vitalis et al. | |
| 2011/0073102 A1 | 3/2011 | Hanson et al. | |
| 2012/0040135 A1 | 2/2012 | Werthen et al. | |
| 2012/0234470 A1 | 9/2012 | Nishio et al. | |
| 2013/0224419 A1 | 8/2013 | Lee et al. | |
| 2013/0244006 A1 | 9/2013 | Ebnoether | |
| 2015/0044494 A1 | 2/2015 | Ebnoether | |
| 2015/0165724 A1 | 6/2015 | Cox et al. | |

FOREIGN PATENT DOCUMENTS

| | | |
|---|---|---|
| DE | 102006007346 A1 | 8/2007 |
| GB | 2182703 A | 5/1987 |
| WO | WO-00/26020 A1 | 5/2000 |
| WO | WO-2007/001947 A2 | 1/2007 |

OTHER PUBLICATIONS

Carey, John, "What's Next—Green Biz Materials of New Plastics and a Steel Sandwich," BusinessWeek, Oct. 22, 2007, 1 page.
". . . Honeycomb Structure Holds Potential," Autotech Daily, Apr. 15, 2008, 1 page.
Vasilash, Gary S., "From Small Things: Big Differences," Automotive Design and Production, Jun. 2008, 1 page.
Photos of Hyundai "EcoCell" trailer, containing doors including CellTech LLC's three sheet steel sandwich, shown at U.S. tradeshow in Mar. 2013.
Ebnoether, Fabien, et al., "Predicting ductile fracture of low carbon steel sheets: Stress-based versus mixed stress/strain-based Mohr-Coulomb model," International Journal of Solids and Structures 50 (2013; published online Dec. 27, 2012), pp. 1055-1066.
"UltraSteel" brochure published by Hadley Group in Oct. 2010, 8 pages.
Kim, Jang-Kyo, et al., "Forming and failure behaviour of coated, laminated and sandwiched sheet metals: a review," Journal of Materials Processing Technology, 63, 1997, pp. 33-42.

(56) References Cited

OTHER PUBLICATIONS

Van Straalen, Ijsbrand J., "Comprehensive Overview of Theories for Sandwich Panels," TNO Building and Construction Research, 1998, pp. 48-70.

* cited by examiner

CONTAINER APPARATUS INCLUDING A SANDWICH STRUCTURE

CROSS-REFERENCE TO RELATED APPLICATIONS

This application is a National Phase Entry of International Patent Applicatin No. PCT/US2015/022546, filed on Mar. 25, 2015, which claims the benefit of U.S. Provisional Application Ser. No. 61/970,636, filed on Mar. 26, 2014, both of which are incorporated by reference herein.

BACKGROUND

The present invention relates generally to containers and more particularly to a container apparatus including a sandwich structure.

It has long been desired in the box trailer industry to have walls and floors made of lightweight and strong panels which are strongly joined together. Exemplary conventional attempts at such a construction are disclosed in the following United States patents and patent publication: U.S. Pat. No. 7,971,926 entitled "Trailer Having Reduced Weight Wall Construction" which issued to Lemmons on Jul. 5, 2011; U.S. Pat. No. 6,199,939 entitled "Composite Joint Configuration" which issued to Ehrlich on Mar. 13, 2001; and 2013/0224419 entitled "Composite Panel and Joint Construction" which published to Lee et al. on Aug. 29, 2013. All of these are incorporated by reference herein. It is noteworthy, however, that these conventional approaches do not provide sufficient strength to support a trailer floor and/or require difficult and expensive to manufacture panel-to-panel attachments. Furthermore, most traditional devices require additional add-on attachment brackets which span between the adjacent panels; but these configurations typically require juggling of many loose parts while attempting to align and hold the panels in position, along with undesired extra part handling and weight. The localized attachment points also undesirably concentrate the forces during use thereby creating premature panel fractures at the localized points.

U.S. Pat. No. 4,275,663 entitled "Corrugated Vehicle Underframe," which issued to Sivachenko et al. on Jun. 30, 1981, discloses corrugated sheets between trailer cross-beams and a floor. This patent is incorporated by reference herein. Honeycomb patterns are created between the corrugations. This traditional construction, however, adds significant total thickness when the separate underlying cross-beams are taken into account. Furthermore, some of the corrugated sheets span the entire length of the trailer thereby require forming at the final trailer assembly location which is often impractical.

SUMMARY

In accordance with the present invention, a container apparatus includes a sandwich structure. In another aspect, a sandwich structure of a container apparatus employs at least one core sheet including alternating peaks and valleys therein in addition to at least one adhesively bonded outer face sheet. Yet another aspect of a sandwich structure of a container apparatus has raised ridges bridging between adjacent peaks in a core sheet in one direction but not in a perpendicular direction, thereby achieving different properties in the different sheet directions. Another aspect employs at least three stacked cores between outer sheets. Moreover, another aspect of a container apparatus includes a wheeled box trailer, an intermodal shipping container, a railroad car, or other box-like holding and transporting device. An inner container liner, such as a floor, or structural container frame rail is attached to a structural sandwich in another aspect. A joint or connection between adjacent sandwich structures, and/or a sandwich structure and an elongated beam is also provided.

The present container apparatus including a sandwich structure is advantageous over prior constructions. For example, the present apparatus is advantageously lightweight, extremely strong and easy to assemble. The present connector advantageously spreads usage loads over a larger surface area thereby avoiding failures. Furthermore, structural beams or posts are preassembled within the present sandwich, in some embodiments, thereby making container assembly easier and stronger, while allowing the sandwich to be manufactured and pre-assembled in a site different than a final container assembly site.

The present apparatus advantageously provides improved trailer and railroad car aerodynamics since the traditional underlying cross-beams create significant drag, while the present device incorporates such within the sandwich structure. The smooth bottom sandwich surface reduces aerodynamic drag and thereby improves tractor or locomotive fuel efficiencies. Furthermore, the present apparatus increases internal cube or storage space within a container. The incorporation of cross-beams within the present sandwich structure eliminates the need for the traditional thicker, separate I-beams. Additionally, a modularized floor for a container, vehicle or watercraft is provided with the present apparatus to optimize and tailor floor load and weight capabilities in a pre-assembled and quick to finally assemble manner depending on the end use performance requirements desired. Additional advantages and features of the present invention can be ascertained from the following description and appended claims, as well as in the accompanying drawings.

DETAILED DESCRIPTION

Figure 1:
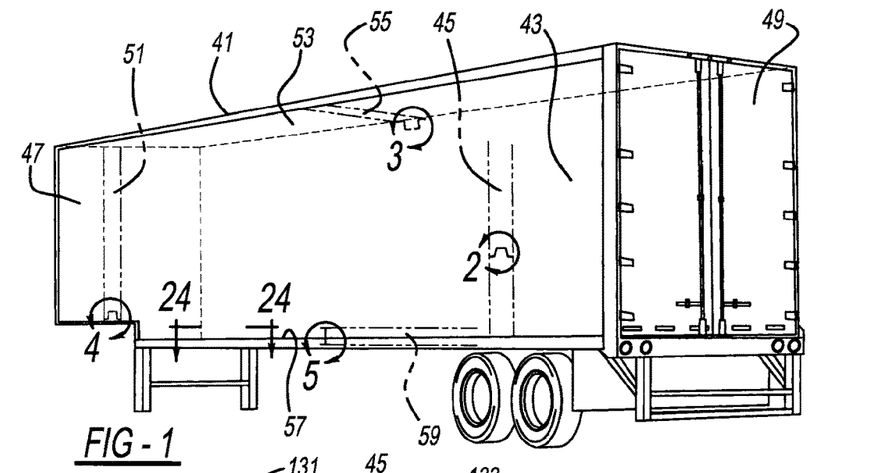
FIG. 1 is a perspective view showing a wheeled trailer type of container apparatus of the present invention employing sandwich structures.
Figures 2, 3, 4, 5:
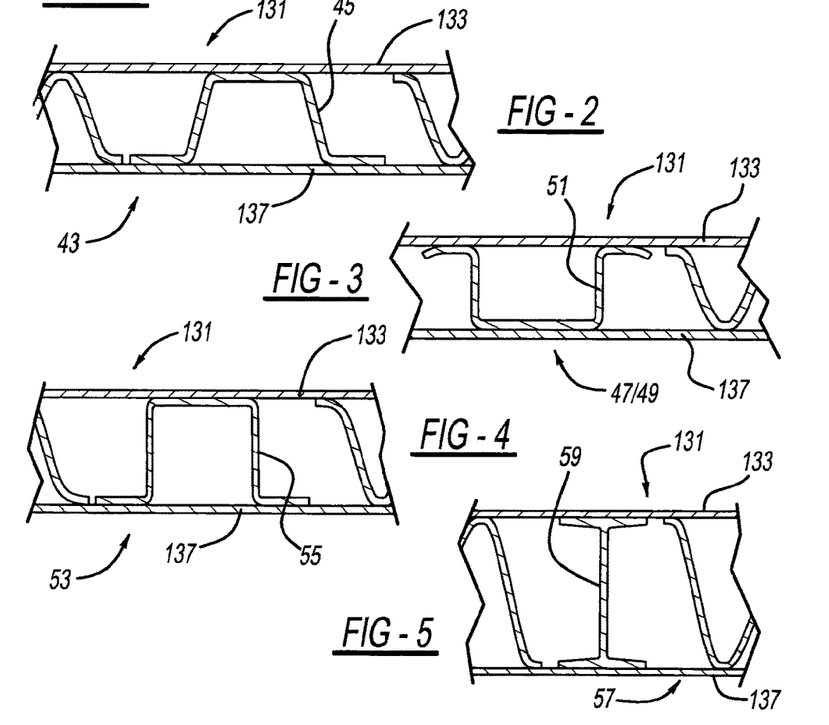
FIG. 2 is a cross-sectional view, taken within circle 2 from FIG. 1, showing a side post employed within the present sandwich.
FIG. 3 is a cross-sectional view, taken within circle 3 from FIG. 1, showing a roof bow employed within the present sandwich.
FIG. 4 is a cross-sectional view, taken within circle 4 from FIG. 1, showing a front post employed within the present sandwich.
FIG. 5 is a cross-sectional view, taken within circle 5 from FIG. 1, showing a cross member employed within the present sandwich.

FIGS. 1-5 illustrate the transportation container 41, preferably a wheeled box trailer, which includes various configurations of a multiple panel sandwich structure 131 therein. Sandwich structure 131 is employed to serve as a side wall panel 43 containing a structural side post 45 between outer face sheets 133 and 137. Post may have a hat section (as shown in FIG. 2), a Z section, a double hat section or other configurations as shown hereinafter. Sandwich structure 131 can alternately be used as a front wall 47 or movable door 49, including a nose or tail post 51 of a hat or other cross-sectional configuration. Sandwich structure 131 may alternately define a roof 53 including an internal hat shaped roof bow 55 between outer sheets 133 and 137. Moreover, sandwich structure 131 may define a load bearing floor 57 structure including an I-beam shaped post member 59 between outer sheets 133 and 137. Unless other specified hereinafter, all of the trailer container constructions disclosed herein are also suitable for defining sections of other transportation containers such as an intermodal shipping container, a railroad car, cargo holding portions of a utility van, decks of a watercraft such as a cargo carrying ship, and the like.

Figure 6:
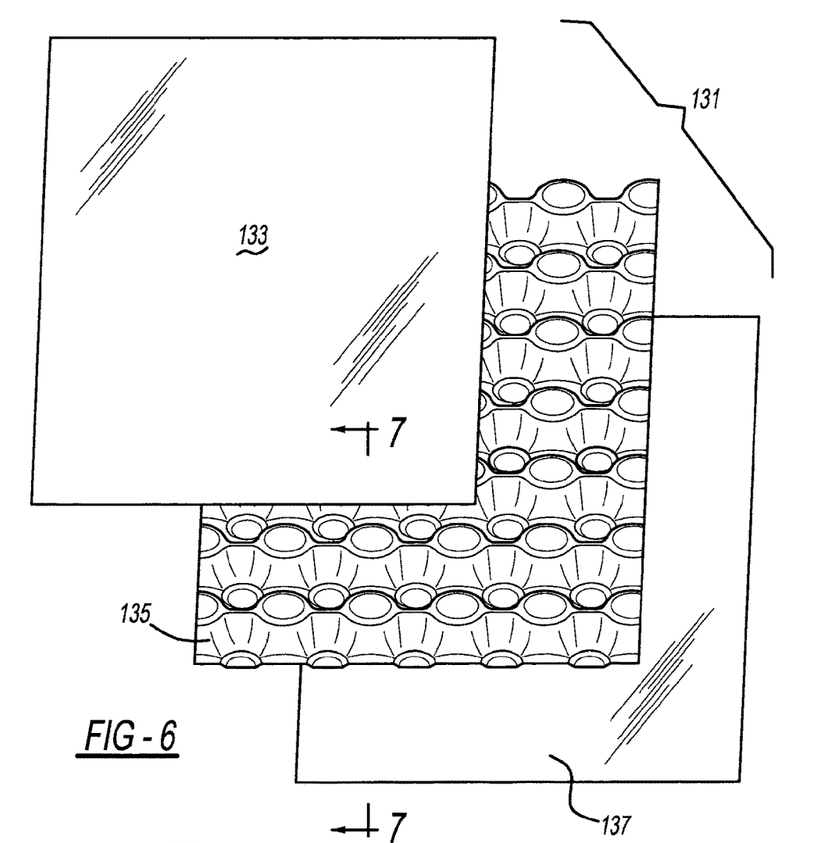
FIG. 6 is an exploded perspective view showing the present sandwich.
Figure 7:
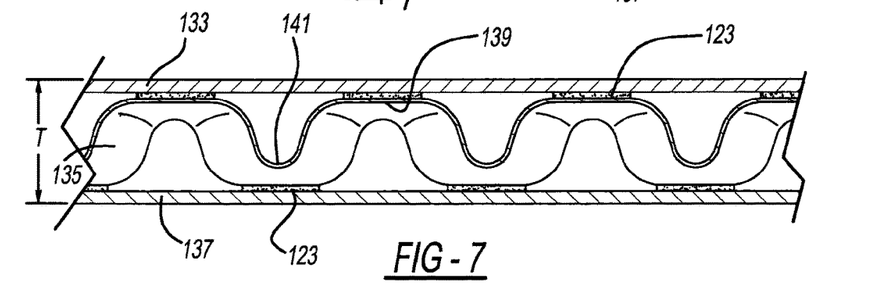
FIG. 7 is a cross-sectional view, taken along line 7-7 of FIG. 6, showing the present sandwich.
Figure 8:
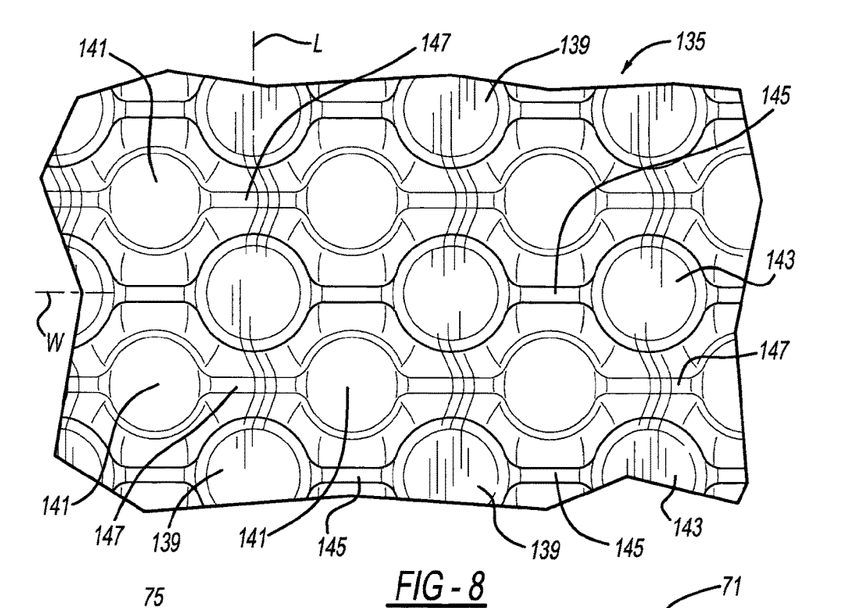
FIG. 8 is a true elevational view showing a formed core sheet employed in the present sandwich.

Sandwich structure 131 can be observed in greater detail in FIGS. 6-8. Sandwich structure 131 includes a first generally flat, outer face sheet 133, a middle core sheet 135 and an opposite second generally flat, outer face sheet 137. Furthermore, core sheet 135 includes alternating peaks 139 and valleys 141, the external surface of each being defined by a generally flat land 143. Moreover, raised ridges 145 bridge or span between adjacent peaks 139 along a first width direction W but not in the perpendicular length direction L, where a more abrupt and steeply angled depression 147 is formed. Depressions 147 are located between adjacent peaks 139 along second direction L although each depression is elongated parallel to ridges 145 since the depressions are created on the back side of the ridges when the core sheet is formed into the desired contours from an initially flat workpiece sheet. Each ridge 145 is slightly lower than the generally flat lands 143 of the neighboring peaks 139. Sheets 133, 135 and 137 are preferably metallic, such as low carbon steel or aluminum, but any or all of these sheets may alternately be stainless steel or other metallic materials. The metal grain structure is also different in the roll/feeding direction L of core sheet 135 than in the cross-roll/cross-feeding direction W.

The placement of ridges 145 and depressions 147 between the alternating peaks and valleys of core sheet 135 give the core sheet asymmetrical properties or characteristics after and during forming. For example, a length shrinkage factor fs, which is the initial core sheet length versus the formed end sheet length, is at least 1.08, and more preferably at least 1.10 in the roll direction L, as compared to a shrinkage factor fs of approximately 1.0 in the cross-roll/cross-feeding direction W. Furthermore, an out-of-plane shear stiffness of core sheet 135 is at least 1.3 times greater, and more preferably at least 1.4 times greater in the cross-roll/cross-feeding direction W, as compared to the roll/feeding direction L:

$$[L]-G_{WT}/G_{LT} \geq 1.3$$

Additionally, an out-of-plane shear strength of core sheet 135 is at least 1.05 times greater, and more preferably at least 1.1 times greater in the cross-roll/cross-feeding direction W, as compared to the roll/feeding direction L:

$$[L]-\tau_{WT}/\tau_{LT} \geq 1.05$$

In other words, the formed core sheet 135 can be torqued or flexed about an axis parallel to direction W considerably easily than in the perpendicular direction about an axis parallel to direction L due to the ridge and depression orientation and positioning. It should be appreciated that the core sheet thickness will vary after it is formed. This asymmetrical core formation is very different than the symmetry desired in prior constructions.

The compressive strength of the present sandwich structure 131, where the outer sheets are bonded to the core sheet, across the cross-sectional thickness (as viewed in FIG. 7). The relative density of this particular sandwich core layer can be calculated as followed:

$$\rho^* = \frac{f_s \cdot t_C}{C}$$

where $t_c$ is the initial sheet thickness of the core layer, C denotes the core layer height and $f_s$ is the shrinkage factor in the length direction L. Thus, the asymmetrical nature of the periodic array of peak and valley cells or dimples, as connected in one direction by raised ridges and separated in the other by steep depressions, advantageously provides for different directional forming and final product properties and characteristics. It is preferred that the open space between the sheets, including versions with multiple core sheets, not define a honeycomb pattern, since such a pattern exhibits differing performance and manufacturing characteristics.

Figure 9:
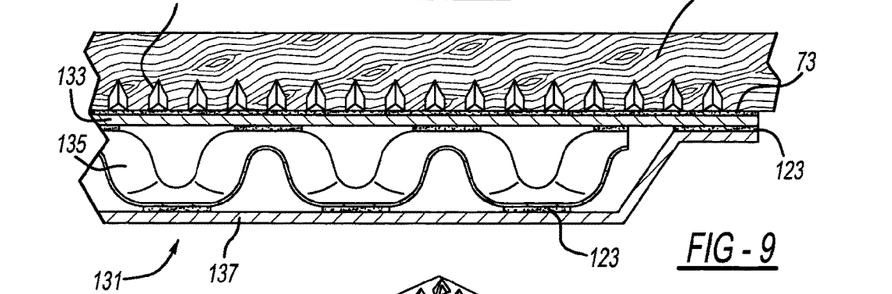
FIG. 9 is a cross-sectional view showing another configuration of the present sandwich.
Figure 10:
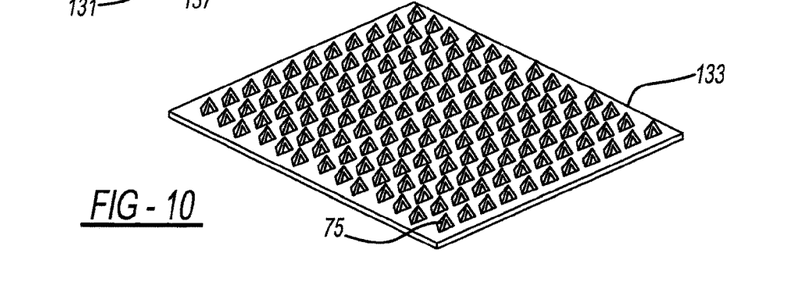
FIG. 10 is a perspective view showing teeth on an outer sheet employed with the present sandwich.

Reference should now be made to FIGS. 9 and 10. A wooden, polymeric or extruded aluminum floor panel 71 or liner is fastened to outer sheet 133 by a layer of adhesive 73 applied to the preassembled sandwich structure 131. Additionally, multiple pointed teeth 75 upwardly project from the otherwise generally flat uppermost surface of outer sheet 133. These teeth 75 are preferably pierced and upwardly bent from sheet 133 prior to it being adhesively bonded to core sheet 135 during the sandwich structure manufacturing process on a manufacturing site remote from a final trailer assembly site. Points of teeth 75 gouge into an underside of floor 71 in order to prevent movement or shear forces from separating the fastened floor from sandwich structure 131 after final assembly.

Figure 11:
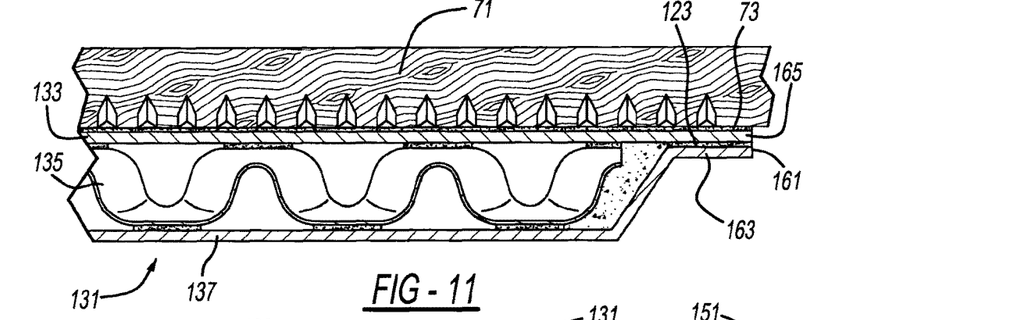
FIG. 11 is a cross-sectional view showing another embodiment of the present sandwich.

Another embodiment of the present sandwich structure 131 can be observed in FIG. 11. In this configuration, outer sheet 137 has a peripheral edge 161 formed or bent into an offset L-shaped flange 163 which mates against an extending flange 165 of opposite face sheet 133. Adhesive 123 bonds together flanges 163 and 165 without core 135 being located therebetween. Thus, during the manufacturing, the core sheet is cut short of the peripheral edge and flange segments of the adjacent outer face sheets prior to stacking and laminating. Attaching flanges 163 and 165 can be provided on one or all peripheral edges of sandwich 131 depending upon the end use desired. It is alternately envisioned that both outer face sheets may also be bent in the offset manner shown for the left sandwich in FIG. 15 with regard to face sheet 133, as will be further discussed hereinafter.

Figure 12:
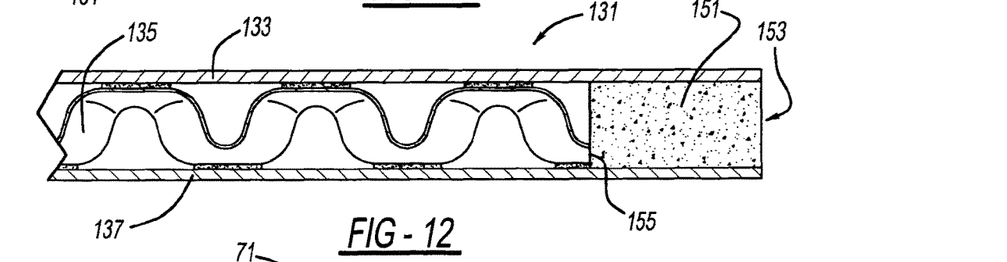
FIG. 12 is a cross-sectional view showing another embodiment of the present sandwich.

FIG. 12 illustrates a variation of sandwich structure 131 wherein a structural epoxy foam member 151 is located between outer sheets 133 and 137, and extends at least the majority length of, and more preferably an entire straight length of, a peripheral edge 153 of the sandwich structure. A peripheral edge 155 of core sheet 135 is terminated inwardly of peripheral edges 153 of outer sheets 133 and 137, such that edge 155 of core sheet 135 abuts against and is preferably encapsulated within structural foam 151 to assist in maintaining the location of and attachment strength to foam 151. Foam 151 is preferably affixed within sandwich structure 131 in a preassembled manner in the manufacturing site prior to being transported to the final container assembly site. This construction is ideally suited for use as a container wall, ceiling or door where structural foam 151 either takes the place of or is supplemental to the structural posts traditionally employed at these locations. An additional inner liner may optionally be adhesively or mechanically fastened to sheet 133. Alternately, foam 151 may instead be a solid polymeric bar.

Figure 13:
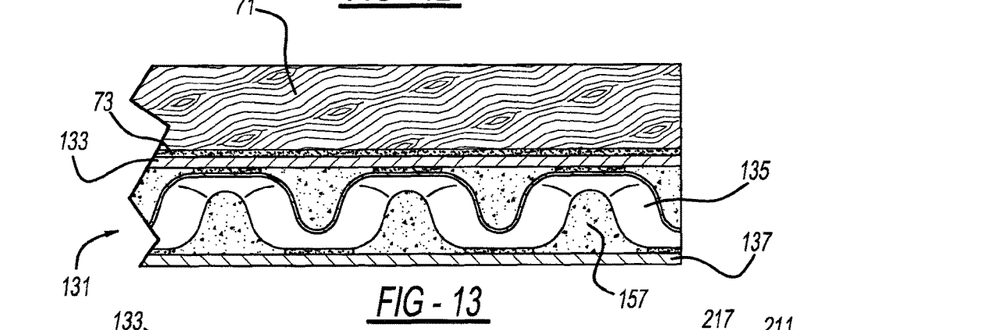
FIG. 13 is a cross-sectional view showing another embodiment of the present sandwich.

FIG. 13 shows a different embodiment wherein container floor 71 or liner is adhesively bonded to outer sheet 133 of sandwich structure 131. Additionally, structural foam 157 is injected or expanded between outer sheets 133 and 137 on both sides of core sheet 135, or alternately, on only a single side of core sheet 135. This configuration is shown with no teeth projecting from outer sheet 133, however, it is alternately envisioned that the teeth of other embodiments shown herein can be provided with this construction as well.

A pelletized or granulated, substantially solid form of foam is located on both sides of core sheet 35 prior to lamination of an outer face sheet 33 thereon. The foam is preferably either an expandable structural foam or an expandable insulating foam, which also serves to adhere core sheet 135 to outer sheet 133 instead of requiring a separate adhesive coating station. Exemplary structural and insulating foam materials can be found in U.S. Pat. No. 6,846,559 entitled "Activatable Material" which issued to Czaplicki et al. on Jan. 25, 2005, and U.S. Pat. No. 3,950,259 entitled "Pourable Granulated Siliceous Insulation" which issued to Pallo et al. on Apr. 13, 1976, both of which are incorporated by reference herein. Alternately, the foam may be injected into the finished sandwich or molded onto one or both sides of core sheet prior to placement of the outer face sheets thereon.

Figure 14:
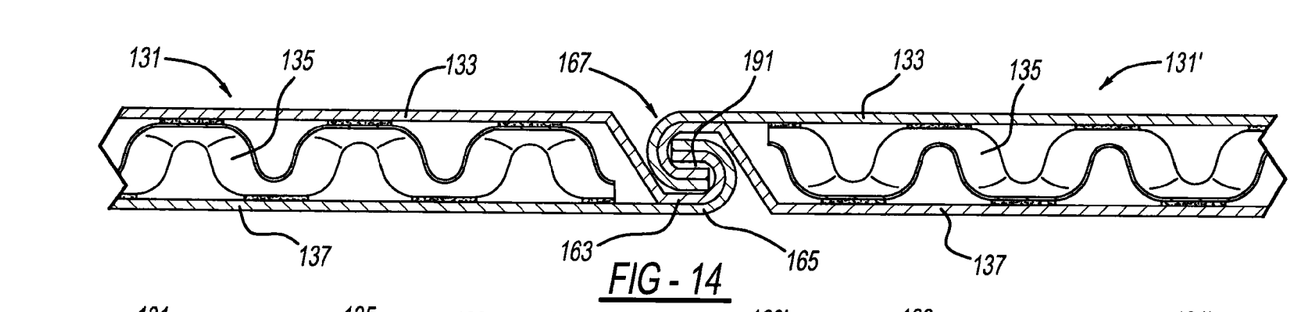
FIG. 14 is a cross-sectional view showing another embodiment of the present sandwich.

FIG. 14 illustrates another variation where flanges 163 and 165 are created in outer face sheets 133 and 137, respectively, and without core sheet 135 between the flanges. In this version, however, a hemming tool folds flanges 163 and 165 upon themselves in a generally U-shaped manner to create a hemmed joint or seam 167 around a peripheral portion thereof; adhesive may or may not be necessary between the flanges in such an arrangement. There is a gap 191 between the hem and flanges. A mirrored image hem flange is provided on a peripheral edge of an adjacent sandwich structure 131'. The two hem flanges are slid into interlocking mating engagement with each other in a first lateral edge direction so as to prevent disengagement therebetween in a perpendicular linear direction L after assembly.

Figure 15:
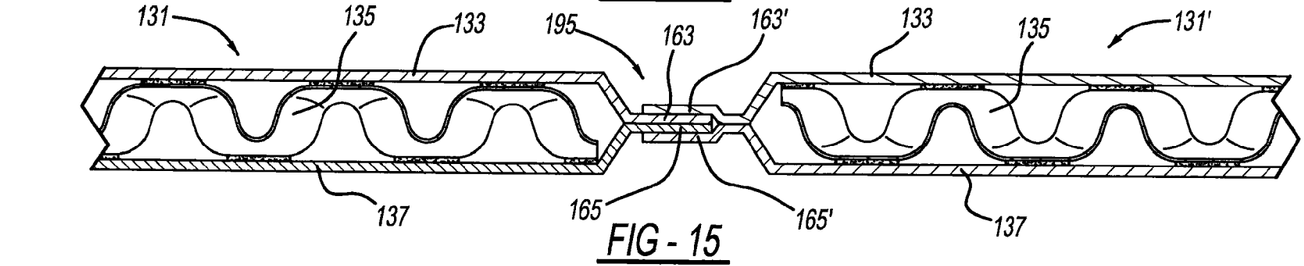
FIG. 15 is a cross-sectional view showing another embodiment of the present sandwich.

As can be observed in FIG. 15, yet another variation of a sandwich 131 includes outer face sheets 133 and 137 sandwiching a formed core sheet 135 therebetween, bonded by adhesive 123 or the like. Adhesive 123, but not core sheet 135, is present at flanges 163 and 165. In this construction, peripheral flanges 163 and 165 of the face sheets are angularly offset along a central plane of sandwich 135 on the left side part. An adjacent sandwich 131' has flanges 163' and 165' which centrally come together and then open back up in a parallel manner with a narrow gap therebetween. Thus, flanges 163/165 and 163'/165' provide a tongue-and-groove interlocking joint 195 between mating adjacent sandwich structures 131 and 131'. Adhesive or mechanical fasteners are employed between the tongue-and-groove joints 195 of the adjacent sandwich structures 131 for permanent attachment together such as for a side, ceiling, floor or door walls for a vehicular trailer or other container.

Figure 16:
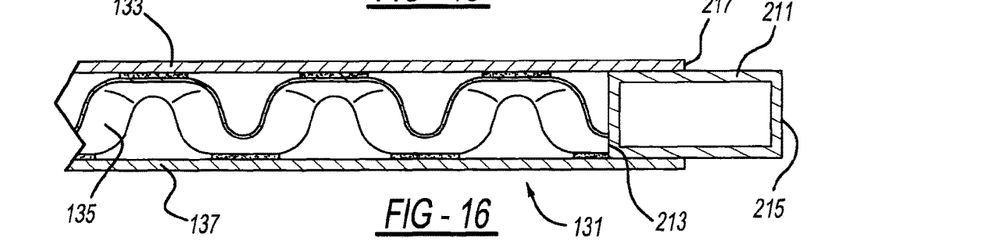
FIG. 16 is a cross-sectional view showing another embodiment of the present sandwich.

FIG. 16 illustrates a different configuration of sandwich structure 131 wherein an elongated connecting member 211 is partially attached within outer sheets 133 and 137 immediately adjacent a shortened peripheral edge 213 of core sheet 135. Adhesive bonding is preferably used to fasten member 211 between sheets 133 and 137, although spot welding or riveting may alternately be employed, for preassembling the member to the sandwich 131 at the sandwich manufacturing site. Member 211 is shown in this configuration as a polygonal rectangle with a hollow center defined by four angularly offset walls 215. Member 211 extends at least the majority length of at least one peripheral edge 217 of sandwich structure 131 and has a segment thereof projecting beyond edge 217 for mating with a corresponding recessed connector member of an adjacent sandwich structure or structural frame rail of the container. A floor or other interior liner may optionally be fastened to outer sheet 133.

Figure 17:
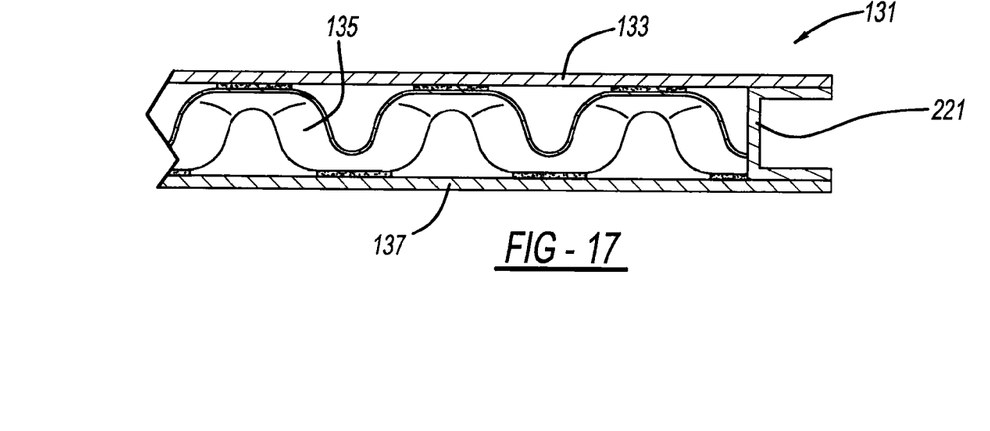
FIG. 17 is a cross-sectional view showing another embodiment of the present sandwich.

FIG. 17 shows a mating sandwich structure which includes a three walled elongated member 211 adhesively secured between outer sheets 133 and 137. Member 221 has a generally C-cross-sectional shape defining an openly accessible recessed cavity therein adapting to receive the projecting segment of connector member 211 of FIG. 16.

Figure 18:
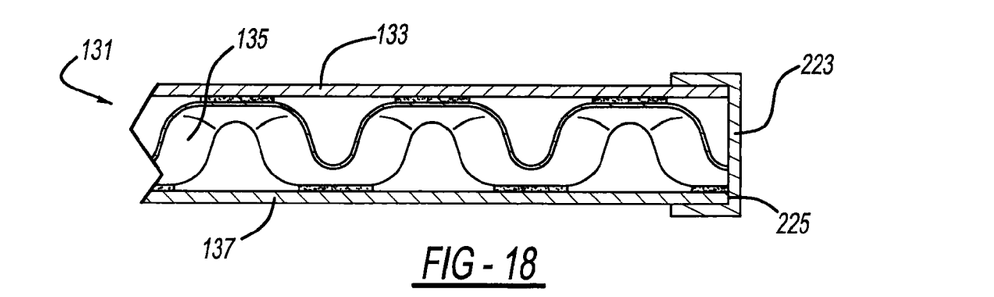
FIG. 18 is a cross-sectional view showing another embodiment of the present sandwich.

Referring now to FIG. 18, another sandwich structure 131 includes a generally C-shaped cap member 223 which is elongated along at least a majority if not entire peripheral edge 225 of outer sheets 133 and 137. Cap is adhesively bonded to exterior surfaces of outer sheets 133 and 137 in order to close out and hide an interior of sandwich structure 131 including core sheet 135 therein. Cap 223 prevents water or dirt entry into sandwich structure 131 and further strengthens a peripheral edge thereof. Cap 223 is preferably stamped, roll formed or extruded sheet metal but may alternately be an injection molded or extruded polymeric material.

Figure 19:
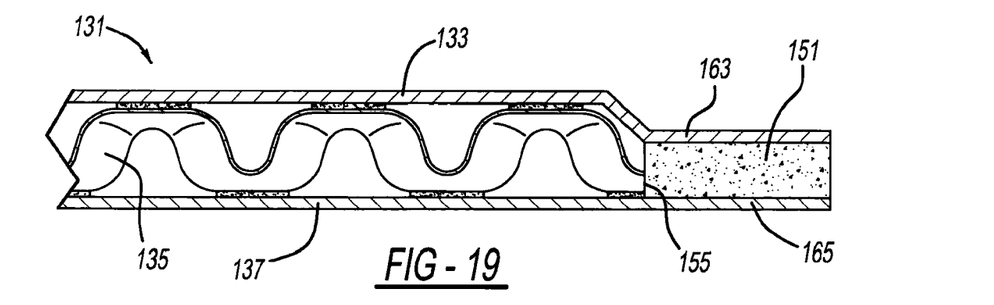
FIG. 19 is a cross-sectional view showing another embodiment of the present sandwich.

FIG. 19 shows an embodiment of a sandwich structure 131 where a structural foam member 151 is located between flanges 163 and 165 of outer sheets 133 and 137, respectively. Peripheral edge 155 of core sheet 135 abuts against and/or is encapsulated within foam 151. Flange 163 is angularly offset and pinched in reduced thickness relative to a nominal thickness of sandwich structure 131. This configuration can be inverted if it is desired to have the offset angled flange 163 on a lower rather than upper side depending upon the edge shape and arrangement of the mating sandwich panel or structural container frame rail. Alternately, foam 151 may be a solid polymeric bar.

Figure 20:
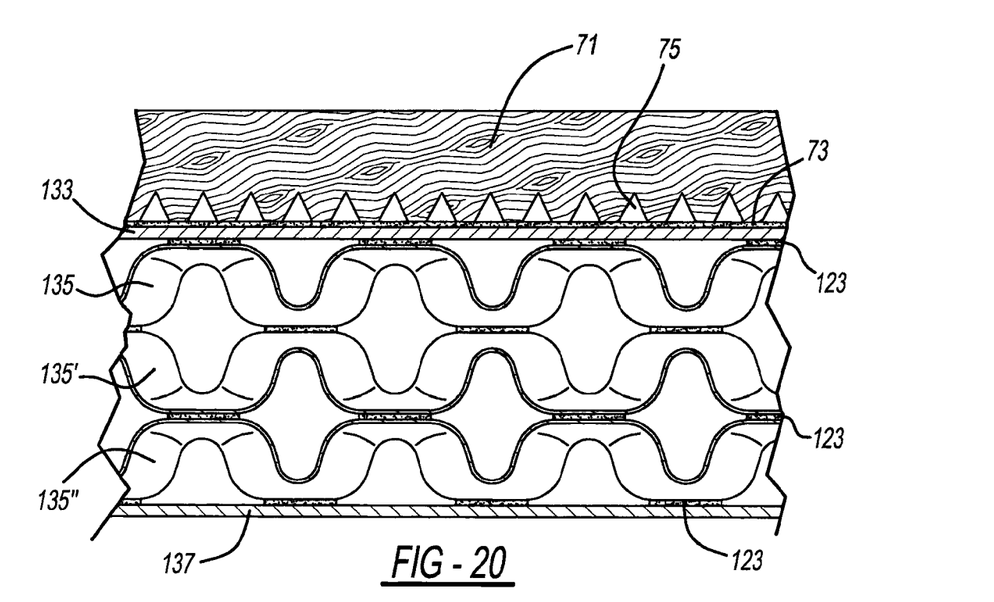
FIG. 20 is a cross-sectional view showing another embodiment of the present sandwich.
Figure 21:
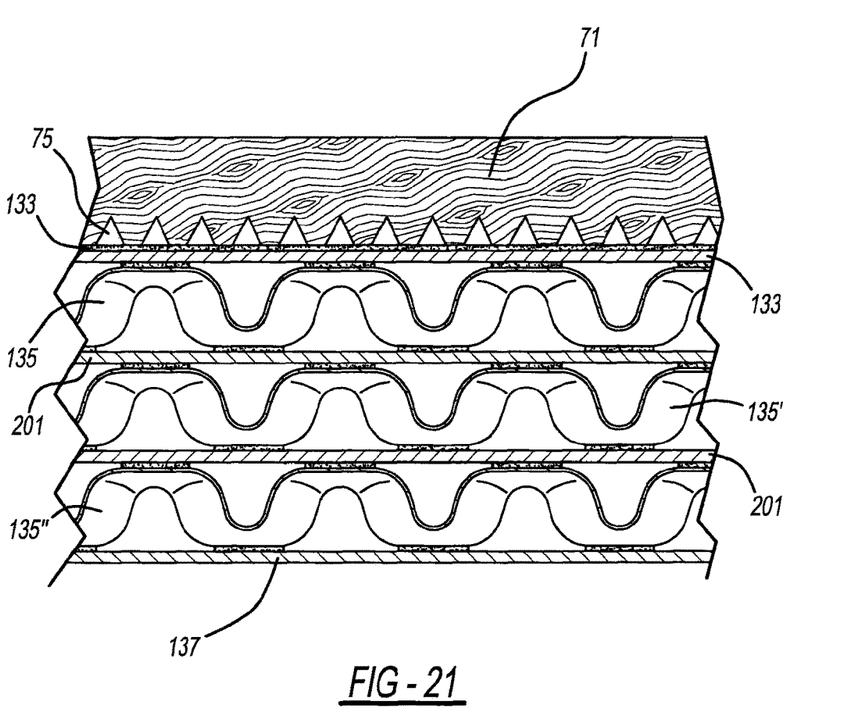
FIG. 21 is a cross-sectional view showing another embodiment of the present sandwich.

Referring now to FIG. 21, multiple core sheets 135, 135' and 135", each having formed peaks and valleys, are employed between outer face sheets 133 and 137. The peaks and valleys of each core 135, 135' and 135" are generally aligned with each other in both roll and cross-roll directions. Intermediate flat sheets 201 and 201' are positioned between the stacked core sheets 135, 135' and 135" with adhesive 123 bonding between the adjacent sheets. In the version of FIG. 20, only outer face sheets 133 and 137 are used, without intermediate sheets between the adjacent touching core sheets 135, 135' and 135". A container floor 71 or other inner liner is fastened to uppermost outer sheet 133 by adhesive 73 and optionally, upstanding teeth 75. It should be appreciated that at least three formed core layers are employed between a pair of outer generally flat face sheets, such that four, five or more cores can be stacked therebetween depending upon the compressive strength and thickness desired. This is ideally suited for the load bearing container floor.

Figure 22:
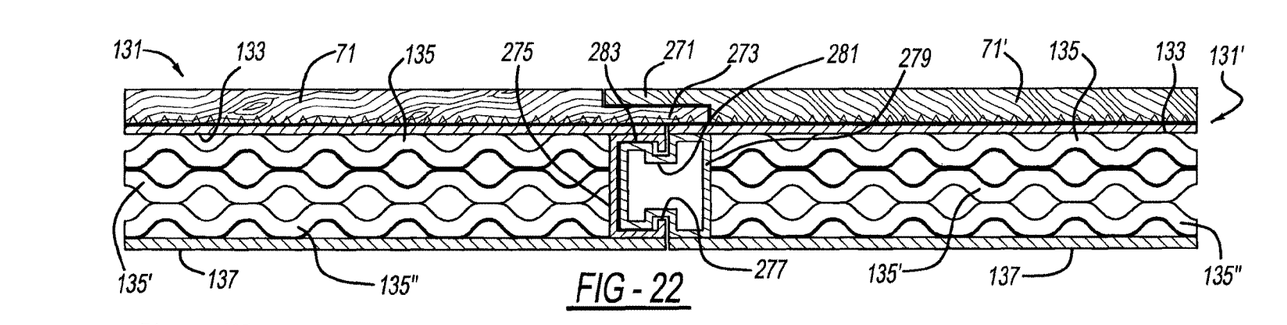
FIG. 22 is a cross-sectional view showing another embodiment of the present sandwich.

Referring now to FIG. 22, a pair of adjacent sandwich structures 131 and 131' each include outer metallic sheets 133 and 137 within which are adhesively bonded three or more core sheets 135, 135' and 135". A floor 71 or other interior liner is fastened upon each uppermost outer sheet 133 of the sandwich structures with reduced thickness and obsolete offset edge segment 271 and 273 thereof overlapping each other at a mating joint therebetween. At least a segment of connecting member 275 is preassembled and secured between outer sheets 133 and 137. This connecting member 275 is elongated along a peripheral edge of sandwich structure 131 and has a generally C-shaped cross-section with inwardly turned flanges 277 and an openly accessible receptacle cavity therein. A preassembled and elongated connector member 279 is attached at least partially between outer sheet 133 and 137 of sandwich structure 131'. Connector member 279 has a predominately polygonal shape consisting of a reduced intermediate neck section 281 and a laterally expanded head section 283 projecting outwardly from the peripheral edge of sandwich structure 131'. Inwardly turned flanges 277 are slid into engagement with reduced intermediate section 281 while overlapping sections 271 and 273 of floors 71 are simultaneously slid relative to each other along an edge direction perpendicular to the view of FIG. 22. Once engaged during trailer assembly, preferably before the side walls are attached thereto, this interlocking engagement of connectors will essentially prevent the adjacent mating sandwich structures 131 and 131' from being linearly pulled apart in a perpendicular direction corresponding to a length of a trailer. It is alternately envisioned that head 283 may have a lead-in taper to allow easier linear insertion but greater resistance to removal in the opposite linear direction. It is alternately envisioned that floors 71 and 71' may be assembled to the sandwich structures after the sandwich structures are securely connected together.

Figure 23:
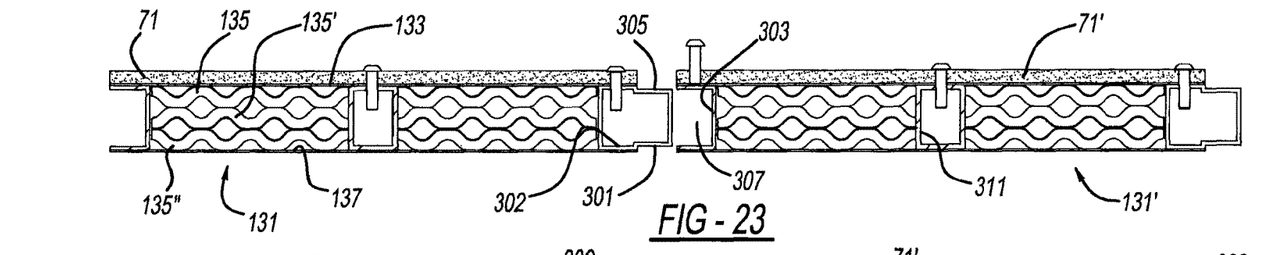
FIG. 23 is a cross-sectional view showing another embodiment of the present sandwich.
Figure 24:
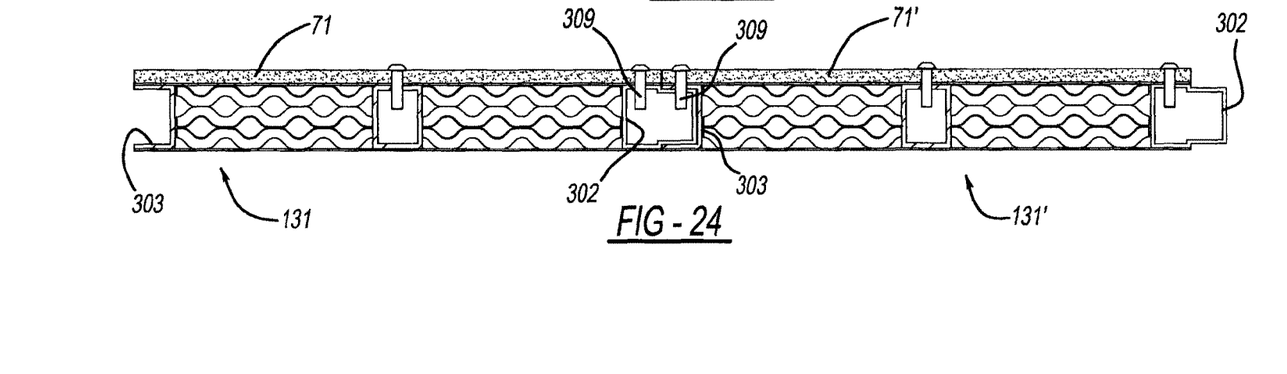
FIG. 24 is a cross-sectional view showing the FIG. 23 embodiment of the present sandwich in an assembled condition.

FIG. 23 illustrates mating adjacent sandwich structures 131 and 131' containing connecting members 301 and 303, respectively. Each of the connecting members is elongated along at least the majority if not entire peripheral edge of the respective sandwich structure and they are preassembled to the respective sandwich structure prior to shipment of the sandwich structure to the final trailer assembly location. Connecting member 301 is preferably a polygonal and hollow shape defined by a laterally enlarged segment 302 secured within outer sheets 133 and 137. Furthermore, a reduced thickness segment 305 of connecting member 301 projects beyond the peripheral edge of sandwich 131 and is engagable within an openly accessible receptacle cavity 307 defined by a generally C-cross-sectionally shaped configuration of connector member 303. As shown in FIG. 24, once the connector members are linearly pushed into mating engagement with each other, mechanical fasteners 309 are laterally inserted to lock and secure the connectors together and to also secure the floor 71 to its respective sandwich structure 131. Mechanical fasteners 309 each have a laterally enlarged head and an elongated shaft extending therefrom. These may constitute blind rivets or threaded fasteners such as screws or bolts.

Additionally, each sandwich structure includes an internal structural beam 311 entirely located between outer sheets 133 and 137 secured thereto by adhesive, welding or rivets in a preassembled manner while the outer sheets and core sheets are being stacked and adhered together. Internal edges of core sheets 135, 135' and 135" terminate short of and abut against side walls defining post 311. Furthermore, each post 311 extends at least a majority length, and preferably the entire length, between opposite peripheral edges such that outboard portions of each beam 311 can be bolted, riveted or otherwise attached to structural frame rails of the trailer or container.

Figure 25:
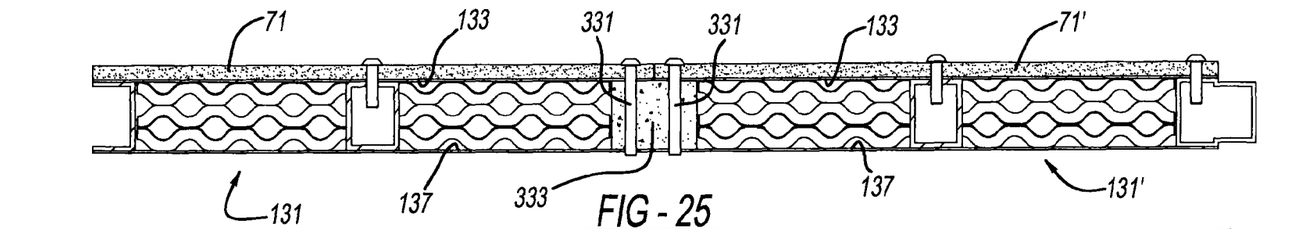
FIG. 25 is a cross-sectional view showing another embodiment of the present sandwich.

Reference should now be made to FIG. 25. In this configuration, sandwich structures 131 and 131' are secured together by mechanical fasteners 331 extending through floors or 71 and 71' or liners, as well as entire sandwich structures 131 and 131'. A single rigid connecting member 333 has a segment attached between outer sheets 133 and 137 of sandwich structure 131 in a preassembled manner which is subsequently received within a hollow space defined by outer sheets 133 and 137 of the adjacent mating sandwich structure 131' during final container assembly. Such a connecting member is elongated along generally the entire peripheral edge of the sandwich structure and may be a structural foam, polymeric block, wooden block or a solid extruded metal bar.

Figure 26:
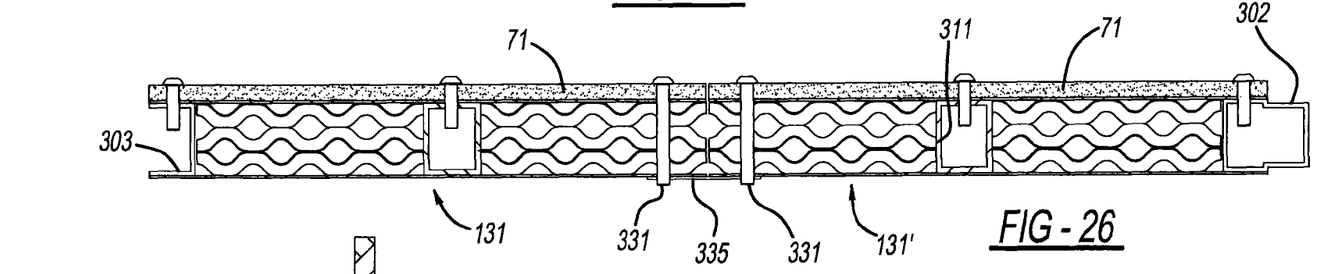
FIG. 26 is a cross-sectional view showing another embodiment of the present sandwich.
Figure 27:
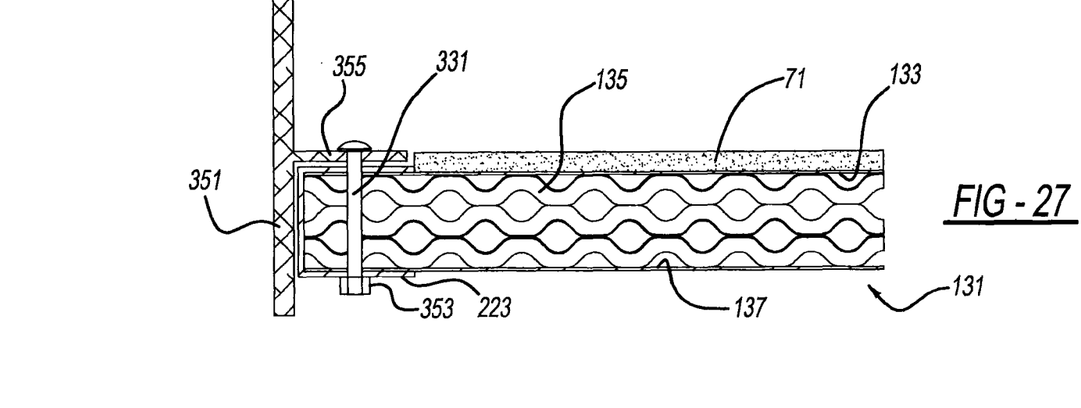
FIG. 27 is a cross-sectional view showing another embodiment of the present sandwich.

FIG. 26 shows yet another embodiment wherein sandwich structures 131 and 131' are secured together, and floors 71 and 71' are secured thereto by mechanical fasteners 331 extending from an outer surface of each floor 71 through the entire sandwich 131 and through an additional plate 335 located on an opposite side thereof. Connectors 302 and 303, and internal beams 311 may also be provided.

Figure 28:
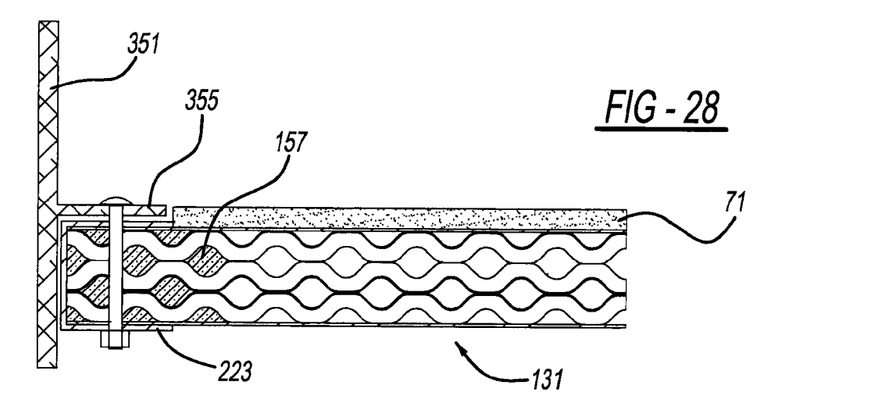
FIG. 28 is a cross-sectional view showing another embodiment of the present sandwich.
Figure 29:
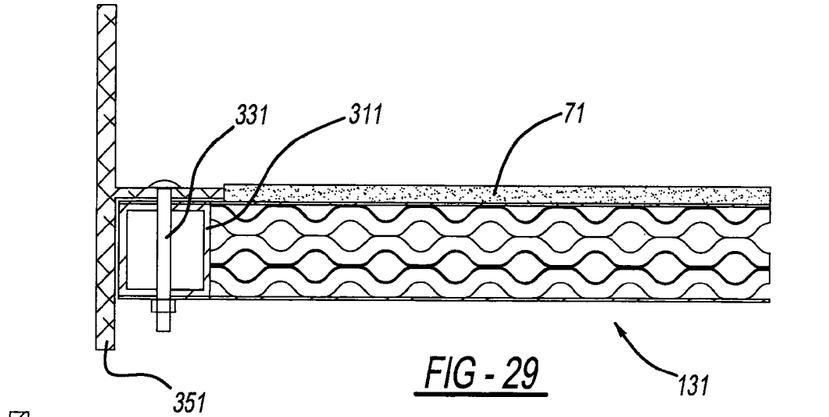
FIG. 29 is a cross-sectional view showing another embodiment of the present sandwich.
Figure 30:
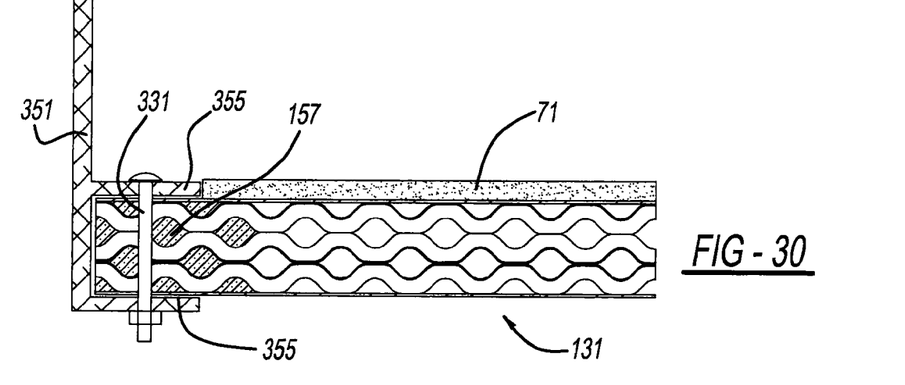
FIG. 30 is a cross-sectional view showing another embodiment of the present sandwich.

Finally, FIGS. 27-30 illustrate additional embodiments of the sandwich structure 131 which is fastened to the structural peripheral frame rail 351 of the container. Such a frame rail defines a chassis if used as a wheeled trailer. A floor 71 is fastened to an uppermost outer sheet 133 and multiple core sheets 135 are attached thereto. A mechanical fastener, such as an externally threaded bolt 331 and internally threaded nut 353, extend through a hole in a flange 355 of frame rail 351, entirely through sheets 133, 135 and 137 of sandwich 131, and through close-out cap 223 in the configuration of FIG. 27. FIG. 28 shows a similar configuration but with structural foam 157 located within sandwich structure 131 to prevent or reduce overcompression. The embodiment of FIG. 29 illustrates an internal beam 311 adjacent a peripheral edge of sandwich structure 131 through which mechanical fasteners 331 also extend. It should also be noted that the configurations of FIGS. 27-29 can be inverted so as to sit on top of flange 355 depending upon the floor height and flange location desired. Moreover, the construction of the FIG. 30 embodiment is like that of FIG. 28 except that a close-out cap 223 is not needed as a pair of flanges 355 effectively close-out the outboard peripheral edges of sandwich structure 131 when finally assembled.

The present apparatus is ideally suited for a modularized floor construction in an intermodal container, trailer, railroad car (box or flat bed), recreational vehicle, automotive truck or van bed, trolley car, watercraft such as a deck of a ship, or the like. The preassembled nature, especially with internal cross-beams and integrated edge connectors, allows for preassembled strength versus weight optimized tailoring and fast final assembly with minimal extra parts.

While various embodiments of the present invention have been disclosed, it should also be appreciated that other variations may be employed. For example, welding, spot welding or blind riveting may be used instead of adhesive bonding between the adjacent sheets, but many of the present weight, cost and quick assembly advantages may not be realized. Additionally, other dimensions and shapes may be provided for the core sheet, however, many of the manufacturing advantages and property strengths will not be achieved. It should also be appreciated that any of the preceding embodiments and features thereof can be mixed and matched with any of the others depending upon the final product and processing characteristics desired. Variations are not to be regarded as a departure from the present disclosure, and all such modifications are intended to be included within the scope and spirit of the present invention.

The invention claimed is:

1. A transportation container apparatus comprising:
   at least one core sheet including alternating peaks and valleys, raised ridges spanning between adjacent of the peaks, top lands of the peaks being larger than the ridges;
   outer sheets attached to and sandwiching the at least one core sheet therebetween, the outer sheets spanning across the peaks and valleys of the at least one core sheet;
   a connector attached to and located at least partially between the outer sheets, the connector being elongated to extend at least a majority of a width or length of the outer sheets;
   a trailer floor attached on top of an uppermost one of the outer sheets; and
   a fastener securing the floor to the uppermost outer sheet, the uppermost outer sheet being metal.

2. The container apparatus of claim 1, wherein the fastener is adhesive and the ridges span between the peaks in one direction but not in a perpendicular direction, and the connector includes flanges, projecting in a width (W) and/or length (L) direction, attached to at least one of the outer sheets.

3. The container apparatus of claim 1, wherein the fastener is a rivet and ridges span between the peaks in one direction but not in a perpendicular direction.

4. The container apparatus of claim 1, wherein the fastener includes a threaded shaft and an enlarged head, and ridges span between the peaks in one direction but not in a perpendicular direction.

5. The container apparatus of claim 1, wherein an edge of the trailer floor includes a reduced thickness segment adapted to mate with a matching reduced thickness segment of another adjacent trailer floor in an overlapping manner so that upper surfaces of the floors are substantially co-planar.

6. The container apparatus of claim 1, wherein the connector includes at least three angularly offset and rigid walls, and the connector is at least partially internally positioned inwardly of peripheral edges of the outer sheets in a direction perpendicular to an elongation direction of the connector.

7. The container apparatus of claim 1, wherein the connector is located adjacent peripheral edges of the core and the outer sheets, and is adapted to connect to a mating connector preassembled adjacent to a peripheral edge of another core and outer sheet sandwich.

8. The container apparatus of claim 1, wherein the connector has a substantially C-shaped cross-section.

9. The container apparatus of claim 1, wherein the connector has a substantially rectangularly-shaped cross-section.

10. The container apparatus of claim 1, wherein the connector has a substantially polygonally-shaped cross-section with a narrowed segment outwardly projecting beyond peripheral edges of the sheets.

11. The container apparatus of claim 1, wherein the connector includes structural foam.

12. The container apparatus of claim 1, wherein the at least one core sheet includes at least three overlying core sheets, each including the alternating peaks and valleys, further comprising at least one inner liner including at least one of: a floor, wall, ceiling or door liner attached to one of the outer sheets.

13. The container apparatus of claim 1, being a wheeled box trailer, and space between the sheets not defining a honeycomb pattern.

14. The container apparatus of claim 1, being an intermodal shipping container.

15. The container apparatus of claim 1, being a railroad car, and space between the sheets not defining a honeycomb pattern.

16. A transportation container apparatus comprising:
   at least one core sheet including alternating peaks and valleys, raised ridges spanning between adjacent of the peaks, top lands of the peaks being larger than the ridges;
   outer sheets attached to and sandwiching the at least one core sheet therebetween, the outer sheets spanning across the peaks and valleys of the at least one core sheet;
   a connector attached to and located at least partially between the outer sheets, the connector being elongated to extend at least a majority of a width or length of the outer sheets; and
   at least one of the outer sheets including pointed teeth upstanding from a substantially flat surface thereof.

17. The container apparatus of claim 1, wherein the connector is a joint adjacent a peripheral edge of at least one of the outer sheets, adapted to mate with an adjacent sandwich of core and outer sheets.

18. The container apparatus of claim 1, wherein the connector is a structural beam entirely contained and attached between the outer sheets.

19. A container apparatus comprising:
- a first sandwich structure including at least one metallic core sheet sandwiched between outer sheets, the core sheet including peaks and valleys alternating in at least two perpendicular directions;
- at least a second sandwich structure including at least one metallic core sheet sandwiched between outer sheets, the core sheet including peaks and valleys alternating in at least two perpendicular directions;
- a first connector pre-assembled adjacent a peripheral edge of the first sandwich structure;
- a second connector pre-assembled adjacent a peripheral edge of the second sandwich structure;
- the connectors being slidably engagable together, one into the other, as the sandwich structures are positioned and assembled adjacent to each other;
- a fastener; and
- a trailer floor attached on top of an uppermost one of the outer sheets of the first sandwich structure by the fastener.

20. The container apparatus of claim 19, wherein an edge of the trailer floor includes a reduced thickness segment adapted to mate with a matching reduced thickness segment of another adjacent trailer floor in an overlapping manner.

21. The container apparatus of claim 19, wherein each of the connectors includes at least three angularly offset and rigid walls.

22. The container apparatus of claim 19, wherein at least one of the connectors has a substantially C-shaped cross-section.

23. The container apparatus of claim 19, wherein at least one of the connectors has a substantially rectangularly-shaped cross-section.

24. The container apparatus of claim 19, wherein at least one of the connectors has a substantially polygonally-shaped cross-section with a narrowed segment outwardly projecting beyond the sheets of the associated first sandwich structure at peripheral edges thereof.

25. The container apparatus of claim 19, wherein the at least one core sheet includes at least three overlying core sheets, each including the alternating peaks and valleys, further comprising at least one interior trailer liner attached to one of the outer sheets of the first sandwich structure.

26. The container apparatus of claim 19, being a wheeled box trailer.

27. The container apparatus of claim 19, being an intermodal shipping container.

28. The container apparatus of claim 19, being a railroad car.

29. A container apparatus comprising:
- a first sandwich structure including at least one metallic core sheet sandwiched between outer sheets, the core sheet including peaks and valleys alternating in at least two perpendicular directions;
- at least a second sandwich structure including at least one metallic core sheet sandwiched between outer sheets, the core sheet including peaks and valleys alternating in at least two perpendicular directions;
- a first connector pre-assembled adjacent a peripheral edge of the first sandwich structure;
- a second connector pre-assembled adjacent a peripheral edge of the second sandwich structure;
- the connectors being slidably engagable together, one into the other, as the sandwich structures are positioned and assembled adjacent to each other; and
- at least one of the outer sheets of the first sandwich structure including pointed teeth upstanding from a substantially flat surface thereof.

30. The container apparatus of claim 19, wherein the connectors interlock together to prevent disengagement in a direction coplanar with an enlarged flat surface of at least one of the outer sheets of the sandwich structures.

31. The container apparatus of claim 19, wherein the connectors engage each other in a linearly insertable tongue-and-groove construction.

32. An apparatus comprising:
- at least one core sheet including alternating peaks and valleys;
- outer sheets attached to and sandwiching the at least one core sheet therebetween, the outer sheets spanning across the peaks and valleys of the at least one core sheet; and
- at least one component of: (a) an elongated structural beam, or (b) an elongated peripheral edge connector, at least partially affixed between the outer sheets;
- wherein the sheets and component define a modularized floor adapted for use in at least one device of: a wheeled trailer, a railroad car, a storage container, an automotive vehicle, or a trolley car.

33. A container apparatus comprising:
- a first sandwich structure including at least one metallic core sheet sandwiched between outer sheets, the core sheet including peaks and valleys;
- at least a second sandwich structure including at least one metallic core sheet sandwiched between outer sheets, the core sheet including peaks and valleys;
- a first connector pre-assembled adjacent a peripheral edge of the first sandwich structure;
- a second connector pre-assembled adjacent a peripheral edge of the second sandwich structure;
- the connectors being engagable together as the sandwich structures are positioned and assembled adjacent to each other;
- a wheeled trailer being coupled to the sandwich structures;
- an interior liner attached to one of the outer sheets of the first sandwich structure, the liner being thicker than the attached outer sheet; and
- a fastener;
- wherein the liner includes a trailer floor attached on top of an uppermost of the outer sheets of the first sandwich structure by the fastener, the floor being of a different material than the attached outer sheet.

34. The container apparatus of claim 33, wherein an edge of the trailer floor includes a reduced thickness segment adapted to mate with a matching reduced thickness segment of another adjacent trailer floor in an overlapping manner.

35. The container apparatus of claim 33, wherein each of the connectors includes at least three angularly offset and rigid walls.

36. The container apparatus of claim 33, wherein at least one of the connectors has a substantially C-shaped cross-section.

37. The container apparatus of claim 33, wherein at least one of the connectors has a substantially rectangularly-shaped cross-section.

38. The container apparatus of claim 33, wherein at least one of the connectors has a substantially polygonally-shaped cross-section with a narrowed segment outwardly projecting beyond the sheets of the associated first sandwich structure at peripheral edges thereof.

39. The container apparatus of claim 33, wherein the at least one core sheet includes at least three overlying core sheets, each including the alternating peaks and valleys, further comprising raised ridges spanning between adjacent pairs of the peaks.

40. The container apparatus of claim 33, wherein the sandwich structures are part of an intermodal shipping container.

41. The container apparatus of claim 33, wherein at least one of the outer sheets of the first sandwich structure includes pointed teeth upstanding from a substantially flat surface thereof.

42. The container apparatus of claim 33, wherein the connectors interlock together to prevent disengagement in a direction coplanar with an enlarged flat surface of at least one of the outer sheets of the sandwich structures.

43. The container apparatus of claim 33, wherein the connectors engage each other in a linearly insertable tongue-and-groove construction.

44. The container apparatus of claim 33, wherein the first connector is a structural beam entirely contained and attached between the outer sheets of one of the sandwich structures.

45. The container apparatus of claim 16, wherein the connector includes at least three angularly offset and rigid walls, and the connector is at least partially internally positioned inwardly of peripheral edges of the outer sheets in a direction perpendicular to an elongation direction of the connector.

46. The container apparatus of claim 16, wherein the connector is located adjacent peripheral edges of the core and the outer sheets, and is adapted to connect to a mating connector preassembled adjacent to a peripheral edge of another core and outer sheet sandwich.

47. The container apparatus of claim 16, wherein the connector is a structural beam entirely contained and attached between the outer sheets, and located between facing peripheral edges of multiples of the at least one core sheet.

48. The container apparatus of claim 16, being a wheeled box trailer, and space between the sheets not defining a honeycomb pattern.

49. The container apparatus of claim 29, being a wheeled box trailer.

50. The container apparatus of claim 29, wherein the connectors interlock together to prevent disengagement in a direction coplanar with an enlarged flat surface of at least one of the outer sheets of the sandwich structures.

51. The container apparatus of claim 29, wherein the connectors engage each other in a linearly insertable tongue-and-groove construction.

52. The container apparatus of claim 32, wherein the device is a wheeled trailer.

53. The container apparatus of claim 32, wherein the component includes both of the structural beam and the connector, and the beam is located between facing peripheral edges of multiples of the at least one core sheet.

54. The container apparatus of claim 32, wherein the component is the connector which includes at least three cross-sectionally offset angled walls extending along at least a majority of at least one peripheral edge of the outer sheets and is adapted to engage a mating connector of an adjacent modularized floor.

55. The container apparatus of claim 32, further comprising adhesive fastening together the sheets and a floor liner adhesively bonded on top of the preassembled sheets.

56. The container apparatus of claim 32, wherein the component is the structural beam, and the beam is located between facing peripheral edges of multiples of the at least one core sheet.

57. The container apparatus of claim 32, wherein the component is the structural beam, and the beam comprises:
 (i) a central wall extending between and toward the outer sheets;
 (ii) a first lateral wall laterally extending from a first end of the central wall parallel to and contacting an adjacent portion of a first of the outer sheets;
 (iii) a second lateral wall laterally extending from a second and opposite end of the central wall parallel to and contacting an adjacent portion of a second of the outer sheets; and
 (iv) a third lateral wall having a portion substantially coplanar with a portion of the second lateral wall and extending in an opposite lateral direction from the second lateral wall.

58. An apparatus comprising:
 (a) metallic core sheets each including peaks and valleys alternating in at least two perpendicular directions;
 (b) metallic outer sheets attached to and sandwiching the core sheets therebetween, the outer sheets spanning across the peaks and valleys of the core sheets;
 (c) at least one elongated structural beam affixed between the outer sheets within a gap between facing peripheral edges of the core sheets, the beam comprising:
  (i) a central wall extending between and toward the outer sheets;
  (ii) a first lateral wall laterally extending from a first end of the central wall parallel to and contacting an adjacent portion of a first of the outer sheets;
  (iii) a second lateral wall laterally extending from a second and opposite end of the central wall parallel to and contacting an adjacent portion of a second of the outer sheets; and
  (iv) a third lateral wall having a portion substantially coplanar with a portion of the second lateral wall and extending in an opposite lateral direction from the second lateral wall;
 (d) wherein the sheets and beam define a modularized vertical wall adapted for use in at least one device of: a wheeled trailer, a railroad car, or an intermodel storage container.

59. The apparatus of claim 58, wherein the beam has an internally hollow and hat cross-sectional shape with multiples of the central wall.

60. The apparatus of claim 58, wherein the beam has an I cross-sectional shape.

61. The apparatus of claim 58, further comprising a wooden or polymeric inner liner is fastened to one of the outer sheets.

62. The apparatus of claim 58, wherein:
 each of the core sheets further comprises raised ridges spanning between adjacent of the peaks in one direction but not a perpendicular direction, top lands of the peaks being larger than the ridges; and
 the beam is entirely located within a sandwich comprising the sheets adhesively bonded together, internally spaced away from peripheries of the outer sheets.

* * * * *